(12) United States Patent
Steffen

(10) Patent No.: US 8,084,394 B2
(45) Date of Patent: Dec. 27, 2011

(54) METHOD FOR THE CONTROL OF HARMFUL MICRO-ORGANISMS AND INSECTS IN CROP PROTECTION WITH MEANS OF DIPOLE-ELECTRICAL AIR-JET SPRAY-TECHNOLOGY, OZONATED WATER AND UV-C IRRADIATION

(76) Inventor: Hanspeter Steffen, Utzenstorf (CH)

( * ) Notice: Subject to any disclaimer, the term of this patent is extended or adjusted under 35 U.S.C. 154(b) by 1476 days.

(21) Appl. No.: 10/552,633

(22) PCT Filed: Apr. 11, 2004

(86) PCT No.: PCT/CH2004/000254
§ 371 (c)(1),
(2), (4) Date: Aug. 1, 2006

(87) PCT Pub. No.: WO2004/089075
PCT Pub. Date: Oct. 21, 2004

(65) Prior Publication Data
US 2007/0123422 A1    May 31, 2007

(30) Foreign Application Priority Data
Apr. 11, 2003 (CH) .................................. 0658/03

(51) Int. Cl.
*A01N 25/00* (2006.01)
*A01N 59/00* (2006.01)

(52) U.S. Cl. .................................... 504/116.1; 424/600
(58) Field of Classification Search .................. None
See application file for complete search history.

(56) References Cited

U.S. PATENT DOCUMENTS

| | | | |
|---|---|---|---|
| 4,978,508 A | 12/1990 | Hansen et al. | |
| 5,213,759 A * | 5/1993 | Castberg et al. | 422/24 |
| 5,269,943 A | 12/1993 | Wickramanayake | |
| 5,405,631 A | 4/1995 | Rosenthal | |
| 5,685,994 A | 11/1997 | Johnson | |
| 5,816,498 A * | 10/1998 | Smith et al. | 239/172 |
| 6,173,527 B1 * | 1/2001 | Pryor | 47/58.1 R |

FOREIGN PATENT DOCUMENTS

| | | |
|---|---|---|
| JP | 61-162124 A | 7/1986 |
| JP | 8-103176 A | 4/1996 |
| JP | 2002-20211 A | 1/2002 |
| JP | 2003-92970 A | 4/2003 |

* cited by examiner

*Primary Examiner* — Shanon A Foley
(74) *Attorney, Agent, or Firm* — Birch Stewart Kolasch & Birch, LLP

(57) ABSTRACT

The invention relates to a plant protection method using ozonized water and UV-C light, applying dipole electric air jet spray technology and wetting agents.

11 Claims, 3 Drawing Sheets

METHOD FOR THE CONTROL OF HARMFUL MICRO-ORGANISMS AND INSECTS IN CROP PROTECTION WITH MEANS OF DIPOLE-ELECTRICAL AIR-JET SPRAY-TECHNOLOGY, OZONATED WATER AND UV-C IRRADIATION

TECHNICAL FIELD

The invention concerns a new crop-protection-method with Ozone and UV-C-Light, and the applied techniques for the implementation of the process according to the preamble of the independent patent claims.

STATE OF THE PRESENT USED TECHNIQUE

For the fight against harmful insects, fungus, bacteria, virus and yeast and other pathogens, high toxic chemicals and substances are used in plant protection up to date, which are toxic residues on crops, created resistances in pests and have a heavy impact on the environment and are also very expensive.

The use of poisonous chemicals for crop protection is therefore today heavily contested and consumers prefer well priced ecologically and bio-environmentally friendly products without toxic contents as residues.

With the new invention, the application of ozonated water and UV-C light and with and new Spray Technology all kinds of plant pathogens can be controlled without the use of toxic, environment damaging and resistance creating substances.

The new plant protection technology is clean, substantially cheaper, equally efficient and over all environmentally friendly and can also be used in ecologically natural growing.

PRESENTATION OF THE INVENTION

The aim of the invention is the presentation of a new, cost efficient environmentally friendly and ecologically procedure for the protection of plants against insects, bacteria, virus, yeast without creating residues and resistancy by chemicals with the use of ozone containing Water, Dipole-electrical Air Job Spray—Technology with a wetting agent and UV-Light.

INTRODUCTION

Ozone, O3 is the 3 atomic form of oxygen.

Ozone is highly reactive and the most powerful oxidation media. It is 51 times more reactive than chlorine and 3125 times faster in the destruction of microorganisms.

Ozone is a highly unstable molecule in gaseous form which disintegrated in a short period of time (half-life time ca. 20 minutes) again in oxygen.

Ozone is created by UV-C radiation or by Corona Cathodic discharge with approximately 7,000 volts.

Ozone is better soluble in water than oxygen.

Ozone is a gas of bluish color, heavy smelling and with an exposition concentration of 0.1 mg per m3/air unproblematic for permanent exposure.

Ozone reacts through the splitting of an oxygen atom when having contract with organic or inorganic compound and leads through the formation of Hydroxy-Radicals to an oxidation respectively to a gradual dissolution of cell walls and membranes of eucariontes are resulting in the destruction of fungus, bacteria, virus, yeast and their spores, and which are paralyzing the respiration organs of insects which consequently results in death.

Ozone can not penetrate through the respiration stomata, only in long exposure where it creates in the plant System Acquired Resistance (SAR).

Ozone alone works in a short contact principle and has itself no systemic effect.

Ozone does not have residues since it disintegrates in a short period of time again in oxygen.

Ozone leaves no damaging effects on plants because of its short action time.

At the same time, ozone creates no resistances in microbes or plant pathogens.

Ozone is therefore, a most effective biocide against fungus, bacteria, virus, yeast, biofilms and protozoa and high creatures like insects, worms, aphids and other pathogenic parasites.

Ozone is permitted by the FDA (Food and Drug Administration) as additive since the 26 Jun. of 2001 in direct contact with foodstuff.

Ozone is also permitted by EPA (Environment Protection Agency) in USA.

UV-C Light as electromagnetic direct radiation has its optional biocidal effect in the wave length spectrum of 254 nanometers against bacteria, yeast, virus and insects.

The irradiation provokes in microorganisms a dissolution of cell-membranes and is destructive to DNA and RNA structures.

In the wave length range of 185 nanometers UV-C radiation creates ozone which under the influence of high humidity generates high oxidative label hydroxyl radicals increase the effect of the ozone as a biocide.

(The efficiency of ozone as a biocide micro biotic Hurdle Principal)

UV-C irradiation of foodstuff is permitted by the FDA USA (Food and Drug Administration) since 1997 and for vegetable foodstuff also in the radiation protection order of Germany.

For the efficiency of the UV-C irradiation, the radiation dose is essential, which is expressed as mW/sec/cm2 (Milli Watt per second per square centimeters of irradiated surface).

The dose to eliminate of microorganisms is preferentially 4,000 to 15,000 mW/sec/cm2 (depending on species).

Insects ca. 500,000-1,500.000 mW/sec/sec/cm2 (depending on species)

The inventor has confirmed during 10 years of research work in the laboratory and in extensive field trials, the efficiency of the new crop—protection method with ozonated water and UV irradiation and the corresponding application technology.

The new crop protection method reaches an efficiency of 92% in mixed infections and simultaneously attack of three (3) insects varieties in weed and bush beans, tomatoes and cucumbers in open air and as well in greenhouse production. Other crops in which the invention was tested and which were treated preventive have not shown any harvest reducing damages.

To the knowledge of the inventor, no scientific work was published as of today in this field of crop protection with ozone and UV-light and with the corresponding Applications—technique for the field application.

THE SOLUTION OF THE TASK

The solution to achieve the task is described in the definition of the independent patent claimed.

According to the invention a process used for the application in crop protection against pathogenic fungus, yeast, bacteria, spores and insects indicates the kind and specifications of biocides (Ozone and UV-C radiation) and the procedure and specifications of the process of this generation, and the way and specifications of the method's technology for an efficient application.

Figure 1:
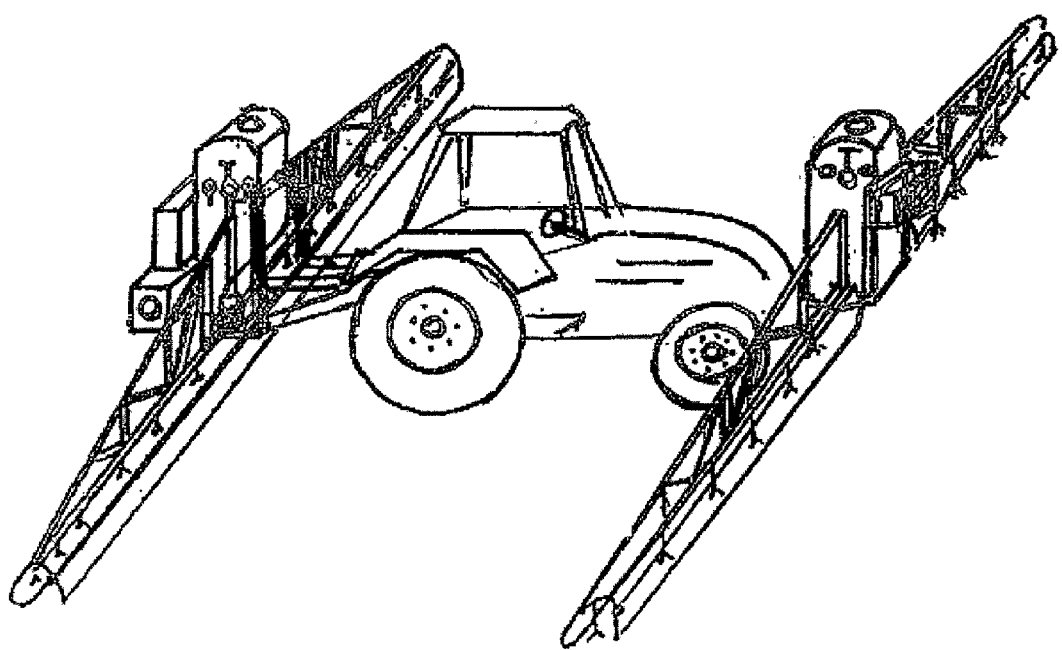
FIG. 1 shows a trailered or tractor hydraulic mounted spray machine.
Figure 2:
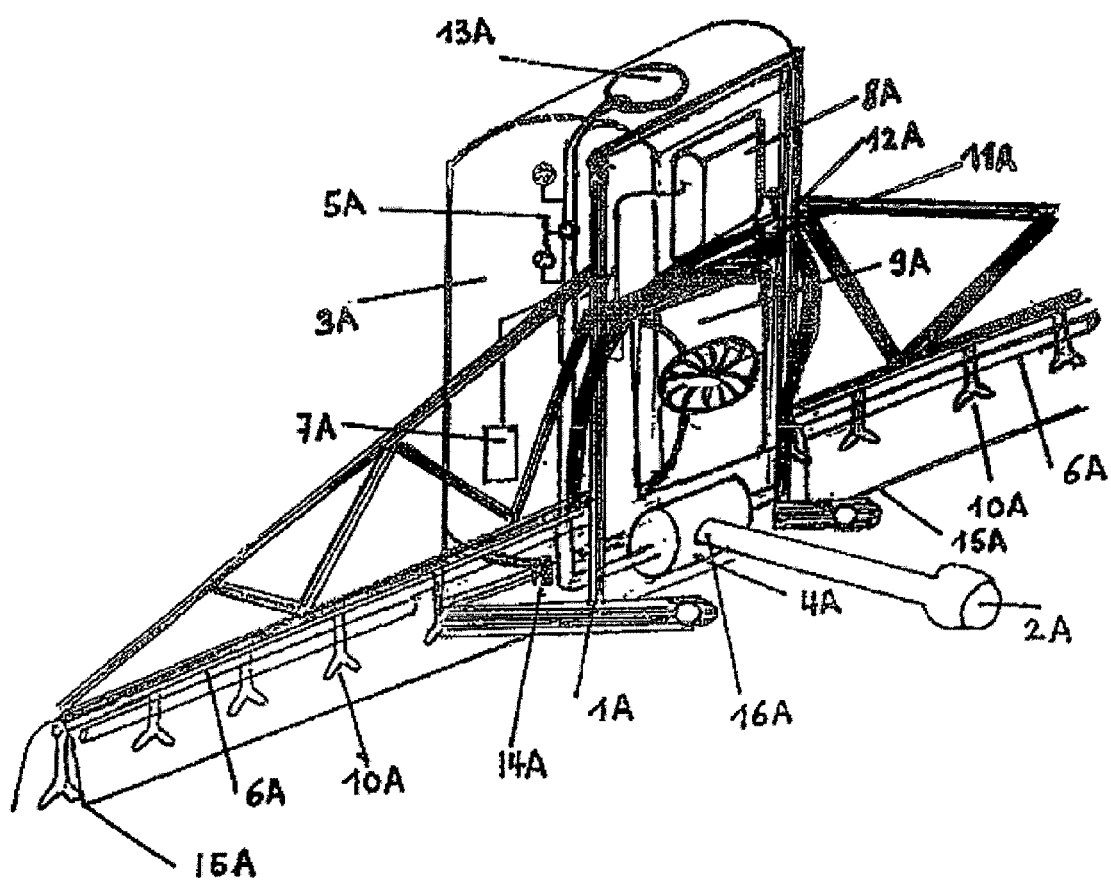
FIG. 2 shows the pre-spray installation.
Figure 3:
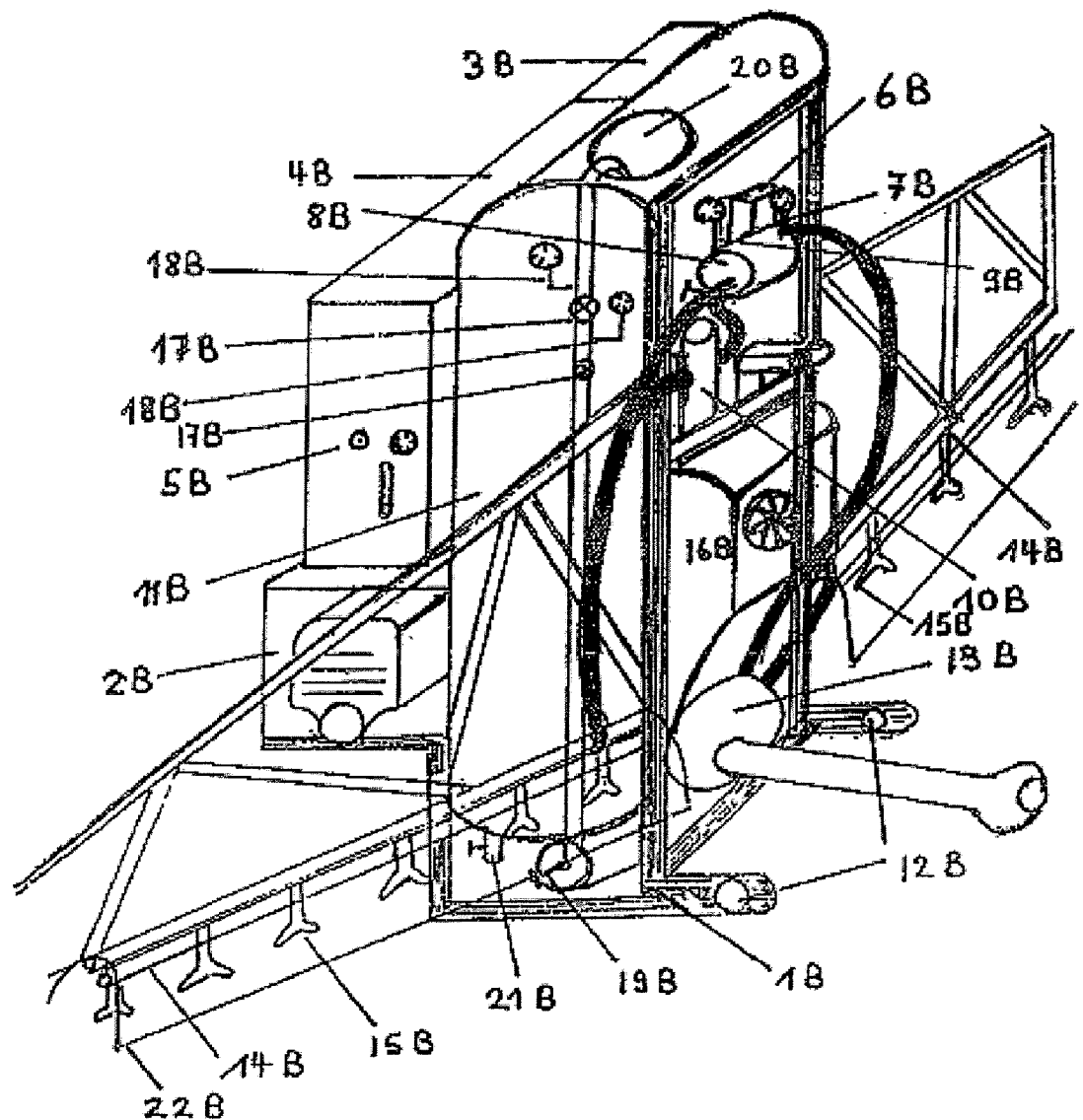
FIG. 3 shows the ozone water spray equipment.

The invention is an integrated system in which the technical components of the ozone and UV—generation and the application technology are integrated in the form of tractor—a trailered or tractor hydraulic mounted spray machine, as shown in FIG. 1, or a hand operated knapsack spray gun.

At the same time, the emphasis of the invention lies not only in the combination of ozone and UV-C radiation as a new application and hurdle—technology for the nest control in crop protection but also in the combined new application technologies, in the dipole electrical spray—method and the air—jet spray technology.

The new combined application technology plays an essential part for the successful employment of ozone and UV-C radiation and fulfills all parameters for an optional effect of the crop protection method.

Without the special application technique, the efficiency of ozone and UV-C radiation is insufficient since the effect of ozone is very volatile and short because of its high molecular instability.

Furthermore the invention is innovative regarding the method of ozonisation of the water with means of a Ventori bulb and the following injection with the turbine, which was especially designed for this application purpose.

With this new injection technique of the extensive mixing of ozone with the spray waters and with the combination of an inorganic wetting agent, the ozone concentration in the dissolved gas bubbles can be up to 17% and has a threefold capacity in the water (up to 1 hour) the fact that ozone gas is transforming to oxygen. With such means the of ozone as a biocide can be substantially increased.

The invention of the new crop protection technology consists in the combination of the creation of ozonated water (1. biocide), in the intermediate tank storage of the ozonated water and in the atomization—spraying of the biocide with the dipole electrical spray technology and direct UV-C irradiation (2. biocide).

The new application methods for the crop protection with ozone containing water and UV-C irradiation consists of the following technical compounds:

1. Pre-spray installation, preferentially PTO—shaft or electrically driven, preferentially in form of a tractor boom-sprayer with tank for the pre-wettening of plants with negatively charged water that may contain an inorganic wetting agent with means on the boom mounted water—spray and air-jet whirl stream nozzles, UV-C radiation lamps and boom sprayer protection-cover adaptable for the exact turning of the spray-mist and the UV-C irradiation.

As shown in FIG. 2, the pre-spray installation comprises the following technical main parts:

1A. Three (3) point hydraulic chassis with tank holders.
2A. PTO-shaft connection or electro meter
3A. Tank for water filling
4A. Sprayer Pressure—Pump
5A. Two (2) pressure Manometers adjustable (entrance and exit pressure)
6A. Two (2) lateral spray—booms with preferable twenty (20) UV—lamps minimum 35 Watts
7A. One (1) anode
8A. One (1) Transformer for alternating and direct current for the negative charging of the spray water.
9A. One (1) Air-blower or air-compressor with pressure tank for the creation of the air-jet stream.
10A. Divers spray nozzle for water and air.
11A. One (1) water-dosing valve.
12A. One (1) reverse pressure valve for water mixer in the tank with handle.
13A. One (1) filling gate for water with pressure seal.
14A. One (1) Tank drainage gate valve.
15A. One (1) Spray boom cover adaptable for the precise guidance of spray-mist air-whirl-stream and UV light.
16A. One (1) PTO-shaft connection for spray pressure—pump.

2. Pulled or hydraulic mounted telescopic boom sprayer PTO-shaft or electrical driven for the spraying of ozonated water via water spraying nozzles with UV-C lamps and Spray boom cover for the precise tuning of the spray and air-stream and the UV-irradiation.

As shown in FIG. 3, the ozone water spray equipment contains the following technical main parts:

1B. Three (3) point hydraulic chassis with tank holders.
2B. One (1) electrical generator with control box.
3B. One (1) Air separator for the production of oxygen.
4B. One (1) generator with cathodic discharge from 98% oxygen.
5B. One (1) ozone-dosing valve
6B. One (1) Ozone in water concentration analysis
7B. One (1) Venturi valve for the injection of ozone in water.
8B. One (1) electrical pressure pump for water tank.
9B. Two (2) pressure manometer (entrance and exit pressure pump with 2 gate valve.
10B. Ozone—gas mixer turbine
11B. One (1) water tank for ozonated water
12B. One (1) driving—chassis or mounting device for tractor hydraulic
13B. PTO shaft or electrical driven water pressure pump made of rust face steal for the spraying of ozone—water.
14B. Two (2) lateral telescopic sprays—booms with minimum 20 mounted 35 Watts UV-C lamps.
15B. Divers Ozone Water Spray and air—jet whirl stream nozzles.
16B. One (1) PTO shaft or electrical driven air—blower or air—compressor with Pressure tank to perform the air whirl stream via the nozzles.
17B. One (1) water-dosing valve
18B. Two (2) pressure manometers (entrance and exit—pressure)
19B. One (1) reverse pressure valve for water—mixer in tank
20B. One (1) gate for water in the tank with pressure seal
21B. One (1) tank drainage valve
22B. One (1) Spray—boom protection cover, adjustable for the precise guidance of the air and whirl stream and the UV—irradiation 3. Pulling and Mounting Equipment Tractor (minimum 65 HP) with front and back—hydraulic system, with adjustable PTO-shaft drive at front and back, with closed drivers cabin with over—pressure ventilation and ozone—filters.

The new application process of the invention consists of two major steps:

1. Complete pre-wettening of the plants to be treated with negative charged water and with inorganic wettening agent with the help of the dipole—electrical air—whirl stream technology (air-jet) and UV—irradiation by UV-C lamps.

This pre-treatment of plants is necessary that with the immediately following ozonated water spray treatment all parts of plants are coming in contact with ozone (reactive oxidizing radicals) and that the ozonated water is distributed on the leaves regularly in form of a film.

Through the air-whirl stream of the electrostatic spray nozzles on the spray boom, the plants are shaken without damages in such a way that the whole plants are wet also on the underside of leaves and all parts in the center and at the foot.

The inorganic wetting agent guarantees an even distribution on the leafs of the crop in form of a film, created by negative charged water and not only by micro-drops what is ensuring a complete moistening.

The negative electrical charge of the water film guarantees that the immediately after ozonated water with a positive Dipole in of a mist reaches all parts and zones of the plant-leafs.

2. Spray-treatment of plants with ozonated water, with the help of a new ozone spray-valve mixing technique, respectively with a Venturi valve and pressure turbine and air-jet whirl technique and UV-C irradiation.

Ozone produced out of Oxygen (produced by air-separator 98% pure oxygen) by the method of cathodic corona discharge is injected by aspiration in the water leading to the water tank of the boom-sprayer with a pressure preferably between 1.5 and 2.5 bar by a Venturi valve, and consequently the ozone containing water is mixed in a specially designed pressure turbine with a pressure of preferentially 4.7 to 6 bar in such away that the ozone-gas bubbles consist only in a microform and that they bond well with the water in the desired concentration.

This new method prevents a rapid off gassing of ozone and guarantees that the ozone gas remains in water solution during the spraying performance with pressures between preferentially 4 and 10 bar.

Spraying is done with spray pressures preferentially between 4 and 10 bar.

Hereby, different spray and air-nozzles are used.

The air nozzles create with the special adaptable spray-boom-cover an air-whirl which is shaking the to be treated plants in such a way, that the ozone containing water can reach all plant—parts and above all as well the underside, the heart and the foot of the leafy plant.

The previous moistening with negative charged water results in the fact that ozone with its positive dipole attaches itself immediately to negative water molecules in the water film of the pre-sprinkling, performing completely its oxidative properties on all parts of the plants simultaneously and with the same results.

With the contact of ozonated water, with a concentration preferably of 2 mg/liter up to 40 mg/liter in the spray solution (depending of pathogenic pressure and plant variety), fungus, yeasts, bacteria, their spores virus, protozoa and insects are eliminated.

Hereby the CT factor (concentration×contact time in minutes) plays a very important role.

Each plant pathogen has its specific CM-factor, which lies preferentially between approx. 10 and 200 mg Min.

The ozone concentration in water is adjusted according to the corresponding expected pathogen image.

The reaction time of Ozone lies between 20 second and 20 minutes.

The half-life time of Ozone in water is approximately 2 minutes, in other words the ozone concentration in water is reduced by half every 2 minutes.

Ozone not used evaporates quickly again as oxygen.

The radiation with UV-C light with lamps with a power of 35 Watt and a wavelength of 254 Nanometers and/or 185 Nanometers represents, with the creation of highly reactive hydroxy-radical compounds in the moist surrounding of the spray-fog, an additional microbial biocidal hurdle effect.

The use of ozonated water in combination with UV-light for crop protection purposes is extremely effective, cheap and environmentally friendly and may also be used in ecological growing.

The efficiency degree in our own field trials was shown to be up to 92%, which complies with the norms of conventional crop protection methods or even better.

Ozone treatments in combination with UV-C light for crop protection create no residues.

All ozone transforms in a short period of time (hours) again in oxygen.

Ozone and UV-C light in short exposure do not harm plants in any way, since Ozone and UV-Light only are able to enter molecular cell membranes of microbes and not cell walls of plants, because the contact time is too short.

Ozone treatments and UV-C irradiation for crop protection do not create resistancy in pathogens, since the reactivity of the biocides is based exclusively on oxidative processes.

Ozone treatments for crop protection are environmentally friendly, since all Ozone molecules are disintegrating again to Oxygen.

The use of Ozone in combination with UV-light is substantially cheaper than conventional chemical spray-methods, because there is no use of expensive chemicals anymore.

The investment in the hardware for the spray-technology is approximately double as high as in conventional Spray-Machines.

The average depreciation time of a sprayer with Ozone technology is approx. 4 years. The life span is minimal 10-15 years.

In such a period more than ¾ of the spraying costs can be saved in comparison with traditional conventional chemical crop-treatment methods.

THE IMPLEMENTATION OF THE INVENTION

For the implementation of the method for the control of fungal-bacterial-viral- and insect-attacks in crop protection with the means of dipole electrical air-jet technology, ozonated water and UV-C irradiation are preferentially one or two hydraulic mounted telescopic boom sprayers or a pulled turbine sprayer necessary, as used in orchards or vineyards.

The sprayers are connected with the back—or the front—hydraulic system or the hook system of a tractor which has a power of preferentially 65 HP and more.

In all cases the tank as specified is filled with 500 or up to 2000 liters of natural clean water which does not contain too much calcer.

The driving shafts to power the spray-pressure pumps and the air-blowers or the air-compressors are connected to the PTO-shaft of the tractor (back and front)

The petrol engine driven electrical generator with preferentially minimal 8 KVA power output is started.

The cables to the electrical transformer on the mounted sprayer in front connected to the switchboard.

The transformer is switched to the position Direct Current DC with a voltage of 1000 to 2000 Volts.

The electrical current to the anode in the insulated tank is now established, and the water and the wetting agent are charged with a negative load, which is necessary to create a negative charge in the water-film during the pre-moistening of the plants.

To the pre-moistening water will be a wetting agent added with 2% in the solution.

The Oxygen-Concentrator and the Ozone-Generator with cathodic discharge will be switched on.

Ozone is now produced, and with a preferential pressure of 1.5 to 2.5 bar injected with a Venturi valve by suction with the help of a pressure pump with preferentially 5 to 8 KVA power performance driving the water-circulation system of the sprayer at the back. Hereby, the under pressure staying ozonated water passes through the integrated turbo-mixer, which is bonding the ozone in microform to the water molecules and leads to a better mixture and stronger bondage of the ozone to the water.

After approx. 5 minutes the desired and established concentration of ozone is reached in the tank and the ozone-generator is regulating itself automatically in ideal position.

In case the established ozone-concentration in the spray-tank is diminishing the ozone-generator starts to work again automatically.

This automatism is regulated by an ozone-measurement probe and an electrical steering unit, which is installed in the switchboard of the spray-machine.

The UV-C lamps are connected to the electrical circuit and are controlled by an automatic switch.

The spray-machines are yet ready for operation.

The PTO driving shafts to the sprayers at the front- and at the back are now put in motion.

The spray-pressure and the pressure of the whirled air are establishing themselves, preferentially at 4 up to 10 bars, depending on the relevant application.

With extended and height adapted spray-booms and correct regulated spraying pressure and spray-volume of approx. 30-80 liters per minute, the spray process can start.

With the spray-equipment at the front hydraulic of the tractor the negative charged pre-moistening-water with the moistening agent (approx. 2% in solution) is sprayed through the driving shaft driven sprayer-pump (5-8 HP) via the special spray-water nozzles on the to be treated plants and at the same time the plants are shaken by air from the special air-nozzles generated by the air-blower and/or air-compressor under the protective spray-boom-cover in such a way that the spray-mist is all parts of the plants inclusive the underside, the core and the foot parts.

After seconds the ozone spraying from the spray-equipment on the back of the tractor is following (speed 3-5 km/h).

The ozone containing spray-solution (milky appearance) is sprayed over the previously with negative charged water treated plants with the same method via the PTO-shaft driven pressure pump and the special spray nozzles with preferentially 4 to 10 bar pressure (different according species of plant and pathogens)

Hereby, a shaking of the crop is achieved at the same time through the air-nozzles protected by the spray-boom cover in such a way, that ozonated water preferentially with a concentration of 3-40 mg/liter is coming in contact with all parts of the plants.

Through the negative charge of the pre-moistening water an intense electrostatic bonding with the ozone-spray fog with a positive dipole is achieved on all parts of plants, which is increasing the oxidative action of the ozone and which guarantees that the oxidation of pathogens happens on all surfaces.

The ultraviolet beams mounted at the front and back of the sprayers increase substantially the effect of the ozone application through the creation of highly oxidative hydroxy-radical species transformed in the humid atmosphere of the spray fog. The hurdle-principle, whereby cellular defence-mechanisme of pathogens fail when attacked by applying more than one biocide, is functioning very well.

With this new preventive spray-technology and with the use of ozonated water it is possible to control, 92% of all fungus, yeast, bacteria, virus and insects.

The described invention is a new breakthrough spraytreatment-methode for crop-protection.

The technology complies with all requirements of a contemporary modern crop management and can even be used in the ecological and bio-production.

The new spray-technology-process and the used technique are simple, cheap and environmentally friendly and do not create residues on food-plants nor do they create resistances in fungus, yeast, virus and insects, as those are well known effects of conventional chemical treatments.

PULLED AND MOUNTED EQUIPMENTS

Tractor (minimal 65 HP) with front- and back-hydraulic, with adaptable front- and back PTO-shaft-drives, with closed driver's cabine with overpressure ventilation and ozone-filter.

The Pre-Spray Equipment Contains the Following Mainparts

1A. Three (3) point hydraulic chassis with tank holders.
2A. PTO shaft connection or electro meter
3A. Tank for water filling
4A. Sprayer Pressure—Pump
5A. Two (2) pressure Manometers adjustable (entrance and exit pressure)
6A. Two (2) lateral spray booms with preferable twenty (20) UV—lamps minimum 35 Watts
7A. One (1) anode
8A. One (1) Transformer for and direct current for the negative charging of the spray water.
9A. One (1) Air—blower or air—compressor with pressure tank for the creation of the air—jet stream.
10A. Divers spray nozzle for water and air.
11A. One (1) water dosing valve.
12A. One (1) reverse pressure valve for water mixer in the tank with handle.
13A. One (1) filling gate for water with pressure seal.
14A. One (1) Tank drainage gate valve.
15A. One (1) Spray boom cover adaptable for the precise guidance of spray-mist air-whirl-stream and UV light.
16A. One (1) PTO shaft connection for spray pressure—pump.

The Ozone Water Spray Equipment Contains the Following Technical Main Parts:

1B. Three (3) point hydraulic chassis with tank holders.
2B. One (1) electrical generator with control box.
3B. One (1) Air separator for the production of oxygen.
4B. One (1) generator with cathodic discharge from 98% oxygen.
5B. One (1) ozone-dosing valve
6B. One (1) Ozone in water concentration analysis
7B. One (1) Venturi valve for the injection of ozone in water.
8B. One (1) electrical pressure pump for water tank.

9B. Two (2) pressure manometer (entrance and exit pressure pump with 2 gate valve.
10B. Ozone—gas mixer turbine
11B. One (1) water tank for ozonated water
12B. One (1) driving-chassis or mounting device for tractor hydraulic
13B. PTO shaft or electrical driven water pressure pump made of rust face steal for the spraying of ozone—water.
14B. Two (2) lateral telescopic spray—booms with minimum 20 mounted 35 Watts UV-C lamps.
15B. Divers Ozone Water Spray and air—jet whirlstream nozzles.
16B. One (1) PTO shaft or electrical driven air—blower or air—compressor with pressure tank to perform the air whirlstream via the nozzles.
17B. One (1) water dosing valve
18B. Two (2) pressure manometers (entrance and exit—pressure)
19B. One (1) reverse pressure valve for water—mixer in tank
20B. One (1) filling gate for water in the tan with pressure seal
21B. One (1) tank drainage valve
22B. One (1) Spray—boom protection cover, adjustable for the precise guidance of the air and whirlstream and the UV—irradiation

The invention claimed is:

1. Method for the protection of crops to control attacks of fungus, yeast, bacteria, virus and insects, the method comprising:
a first step of wetting plants with an inorganic wetting agent by means of dipole-electrical air jet spray-technology; and first irradiating said plants with UV-C light;
a second step of spraying said plants with ozonated water by means of said dipole-electrical air jet spray-technology; and second irradiating said plants with UV-C light.

2. Spray-method for the protection of crops according to claim 1 wherein said dipole-electrical air jet spray-technology includes a first spray device and a second spray device.

3. Spray-method for the protection of crops according to claim 2, wherein all parts of said plants are pre-wetted with negatively charged water and said inorganic wetting agent by said first spray-device.

4. Spray-method for the protection of crops according to one of claim 2 or 3, wherein all parts of said plants are sprayed with said dipole-ozonated water by said second spray-device.

5. Spray-method for the protection of crops, according to claim 1, wherein moistening water with said inorganic wetting agent from a first tank and said dipole-ozonated water from a second tank are whirl-sprayed on said plants by air jet whirl-stream out of special air-nozzles, created by an air-turbine or air-blower or air-compressor.

6. Apparatus for the protection of crops to control attacks of fungus, yeast, bacteria, virus and insects, wherein the apparatus is operable with dipole electrical spray technology and comprises:
UV-C lamps for irradiating plants with UV-C light;

first air jet whirl stream nozzles for wetting the plants with an inorganic wetting agent by spraying said agent with dipole electrical air-jet spray technology; and second air-jet whirl stream nozzles for spraying the plants with ozonated water with said dipole electrical air-jet spray technology.

7. Apparatus according to claim 6, wherein said first air jet whirl stream nozzles are included in a first spray device; and said second air-jet whirl stream nozzles are included in a second spray device.

8. Apparatus according to claim 7, wherein said first spray device is configured for pre-moistening of plants with negatively charged water with said wetting agent; and wherein said first spray device includes:

a 3-point mounted chassis with frame and tank holding device;
an insulated water tank;
an electrical transformer;
an anode disposed in said water tank with a connection cable and security;
at least two lateral telescopic spray booms, each boom having special air and water nozzles including pipings;
at least two UV-C lamps with electrical conducts;
a water pressure-pump with pressure valves and manometers, controls and handles, said water pressure-pump being connected via pipes with said water-tank and said spray-booms;
an air-blower or air-compressor with controls, said air-blower or air-compressor being connected via pipes with the air-nozzles on the spray-booms for whirling of the spray-fog;
a PTO driving-shaft or electrical drive;

reverse pressure- and drainage-valves with handles; and an adjustable spray-boom cover.

9. Apparatus according to claim 7, wherein the second spray device is configured for the spraying of ozonated water; and wherein said second spray device includes:

a 3-point mounted chassis with frame and tank holding device or a pulled trailer-chassis;
an insulated water tank;
lateral telescopic spray-booms with special air- and water-nozzles including pipings or water-spray turbine;
UV-C lamps being equipped with electrical conducts;
a water pressure pump, said water pressure pump including pressure valves, manometers, controls, and handles, said water pressure pump being connected via pipes to said water-tank and said spray-booms;
an air-blower or an air-compressor with controls, said air-blower or air-compressor being connected via pipes to the air-nozzles on the spray-booms, for whirling of the spray-fog;
a PTO driving-shaft or an electrical drive;
reverse pressure- and drainage-valves with handle;
an adjustable spray-boom cover;
an electrical generator with control board;
an ozonated water-pump;
an air-separator for oxygen-production;
an ozone generator with cathodic discharge;
a venturi valve;
a turbine-mixer for ozone;
an ozone gas adjuster;
an ozone-concentration measurement device.

10. Apparatus according to one of the claims 7 to 9, wherein said UV-C lamps are full length UV-C lamps attached under said spray-booms; and where said UV-C lamps are configured to create, in addition to the electro-magnetic direct irradiation, highly reactive oxidative hydroxy radicals in the spray fog, said radicals having an efficient biocidal effect and reinforcing with the hurdle-principle the biocidal impact of the ozone treatment.

11. Apparatus according to one of the claim 8 or 9, wherein each spray boom includes an adjustable spray-boom cover, said cover being configures such that direction and effect of spray application and UV-C light irradiation can be adapted, by controlling the cover's angle of inclination, according to a particular situation or setting.

* * * * *